(12) United States Patent
Chen

(10) Patent No.: US 11,644,366 B1
(45) Date of Patent: May 9, 2023

(54) COMBINED BLUETOOTH THERMOMETER

(71) Applicant: Shenzhen Fanshengda Technology Co., LTD., Guangdong (CN)

(72) Inventor: Manfeng Chen, Shenzhen (CN)

(73) Assignee: Shenzhen Fanshengda Technology Co., LTD., Guangdong (CN)

( * ) Notice: Subject to any disclaimer, the term of this patent is extended or adjusted under 35 U.S.C. 154(b) by 0 days.

(21) Appl. No.: 17/946,178

(22) Filed: Sep. 16, 2022

(51) Int. Cl.
　　*G01K 1/024* (2021.01)
　　*G01K 1/02* (2021.01)
　　*G01K 1/14* (2021.01)
　　*G01K 1/08* (2021.01)

(52) U.S. Cl.
　　CPC ............. *G01K 1/024* (2013.01); *G01K 1/026* (2013.01); *G01K 1/08* (2013.01); *G01K 1/14* (2013.01); *G01K 2207/02* (2013.01)

(58) Field of Classification Search
　　CPC .......... G01K 1/024; G01K 1/026; G01K 1/08; G01K 1/14; G01K 2207/02
　　See application file for complete search history.

(56) References Cited

U.S. PATENT DOCUMENTS

| | | | |
|---|---|---|---|
| D858,320 S * | 9/2019 | Wang | D10/57 |
| D884,496 S * | 5/2020 | Zhang | D10/57 |
| D918,066 S * | 5/2021 | Tang | G01K 1/08 |
| | | | D10/57 |
| 11,366,018 B1 * | 6/2022 | Tan | G01K 1/024 |
| 2010/0012645 A1 * | 1/2010 | Baier | G01K 13/00 |
| | | | 219/413 |
| 2016/0377490 A1 * | 12/2016 | Nivala | G01K 7/42 |
| | | | 374/155 |
| 2017/0254706 A1 * | 9/2017 | Ganrude | G01K 1/08 |
| 2019/0025130 A1 * | 1/2019 | Chu | G01K 1/024 |
| 2019/0049313 A1 * | 2/2019 | Keller | G01K 7/02 |
| 2019/0049314 A1 * | 2/2019 | Chu | G01K 13/00 |
| 2020/0096393 A1 * | 3/2020 | Lion | G01K 1/12 |
| 2020/0182703 A1 * | 6/2020 | Bourret | G01K 7/36 |
| 2020/0214494 A1 * | 7/2020 | Chu | G01K 1/028 |
| 2020/0408609 A1 * | 12/2020 | Bhogal | G01K 1/024 |
| 2021/0177198 A1 * | 6/2021 | Keller | G01K 1/14 |
| 2021/0231503 A1 * | 7/2021 | Wu | G01K 7/22 |

FOREIGN PATENT DOCUMENTS

| | | |
|---|---|---|
| CN | 206163448 U | 5/2017 |
| CN | 212721838 U | 3/2021 |
| CN | 213688723 U | 7/2021 |

* cited by examiner

*Primary Examiner* — Nathaniel T Woodward
*Assistant Examiner* — Philip L Cotey
(74) *Attorney, Agent, or Firm* — Cooper Legal Group, LLC

(57) ABSTRACT

Disclosed is a combined bluetooth thermometer. The combined bluetooth thermometer includes a body box, a first probe and a second probe, the first probe is detachably provided on the body box; the first probe along a length direction of the first probe successively includes a first temperature measurement section, a transition section and a charging section; the first temperature measurement section is configured for temperature measurement; and the charging section is configured for providing an electrical connection between the first probe and the body box for charging the first probe; the second probe includes a second temperature measurement section and a connecting section; the second temperature measurement section is configured for temperature measurement; and the connecting section is connected with the body box to rotationally connect the second probe with the body box.

8 Claims, 6 Drawing Sheets

COMBINED BLUETOOTH THERMOMETER

TECHNICAL FIELD

This application relates to the technical field of thermometer, and in particular to a combined bluetooth thermometer.

BACKGROUND

A thermometer is a tool that can accurately measure temperature, which can be divided into a pointer thermometer and a digital thermometer. According to different usages, a variety of thermometers have been designed and manufactured.

For one of the usages of thermometers, in a process of cooking food (such as meat food), in which the internal temperature of meat food is required to be measured, a thermometer can be inserted into the food to determine the temperature changes during the cooking process. Since some food is cooked in a relatively enclosed environment (microwave oven), the thermometer is required to be able to transfer data. Therefore, a bluetooth thermometer is generally adopted and the bluetooth communication module on the bluetooth thermometer is used for transferring data.

A bluetooth thermometer includes a wired bluetooth thermometer and a wireless bluetooth thermometer. A wireless bluetooth thermometer is generally placed in an enclosed environment. In the process of cooking food, the food is to be cooked in an enclosed environment and then be taken out for processing, and in the subsequent processing, the temperature of the food is also required to be measured. If the wireless bluetooth thermometer is taken out again for measuring the temperature, it is complicated and time-consuming, and thus a combined bluetooth thermometer is needed.

SUMMARY

In order to measure the temperature of food in an enclosed environment and to facilitate to measure the temperature of food when taking out the food from the enclosed environment, the present application provides a combined bluetooth thermometer.

The present application provides a combined bluetooth thermometer, adopting the following technical solutions:

a combined bluetooth thermometer, including a body box, a first probe and a second probe;

the first probe is detachably provided on the body box; the first probe along a length direction of the first probe, successively includes a first temperature measurement section, a transition section and a charging section; the first temperature measurement section is configured for temperature measurement; and the charging section is configured for providing an electrical connection between the first probe and the body box for charging the first probe;

the second probe includes a second temperature measurement section and a connecting section; the second temperature measurement section is configured for temperature measurement; the connecting section is connected with the body box to rotationally connect the second probe with the body box.

By adopting the above technical solution, when it is necessary to measure the temperature of the food during cooking and the food is only needed to be processed in an enclosed environment, the first probe may be removed from the body box and installed in the enclosed environment, and the first temperature measurement section is inserted into the food, so that the temperature of the food during cooking may be obtained; in addition, if the food is cooked and processed in a non-enclosed environment, the first temperature measurement section of the first probe or the second temperature measurement section of the second probe may be directly inserted into the food, so that the temperature of the food during cook may be obtained; if it is necessary to cook the food in an enclosed environment and take out the food for processing, the first probe may be used in the enclosed environment for temperature measurement, and the second probe may be used for temperature measurement when the food is taken out from the enclosed environment for processing; in summary, it is possible to measure the temperature of the food in an enclosed environment, and at the same time, it is convenient to measure the temperature of the food when the food is taken out of the enclosed environment, which is able to improve the efficiency of the temperature measurement during the overall process of food cooking.

In some embodiments, the body box is provided with a placing groove; a plurality of limiting components are provided in the placing groove; a clamping space is formed in each of the plurality of limiting components for clamping the first probe.

By adopting the above technical solution, when the first probe is stored in the body box, the first probe is placed in the placing groove and the two ends of the first probe are placed in the clamping spaces to fix the first probe; during the unused period of the first probe, it is convenient to store the first probe.

In some embodiments, each of the plurality of limiting components includes a connecting piece against a bottom of the placing groove, and two limiting pieces that are respectively provided at two ends of the connecting piece; the clamping space is formed between the limiting pieces and the connecting piece; a limiting piece includes an arc-shaped section close to the connecting piece and a bending section provided at a side of the arc-shaped section away from the connecting piece; a guiding opening is formed between the bending sections of the two limiting pieces, which is configured for the first probe to be embedded.

By adopting the above technical solution, when storing and fixing the first probe, the bending sections are configured to facilitate the first probe to be embedded between the two arc-shaped sections, so that the first probe is able to be placed into the clamping spaces for storing and fixing.

In some embodiments, two charging terminals are provided on an end face of the charging section away from the transition section; two electrodes are provided on an inside wall of the placing groove; when the first probe is embedded into the clamping spaces, the two charging terminals respectively abut against the two electrodes.

By adopting the above technical solution, when the first probe is stored in the placing groove, with the charging terminals and the electrodes configured, the charging terminals on the first probe abut against the electrodes on the body box so that the first probe is able to be charged.

In some embodiments, the two electrodes and the two limiting pieces are elastic pieces; each of the two electrodes includes a sloping section provided on the inside wall of the placing groove and a straight-down section connected with the sloping section; when the first probe is embedded in the clamping spaces, the two charging terminals respectively abut against the straight-down sections.

By adopting the above technical solution, when the charging terminals begin to touch the electrodes, the charging terminals firstly touch the bending sections; as the first probe continues to be embedded in the clamping spaces, the charging terminals squeeze the bending sections and slide to touch the straight-down sections; at this time, the bending sections are always in the state of being squeezed, and the bending sections and the straight-down sections have the tendency to reset, to ensure the consistent contact between the charging terminals and the electrodes.

In some embodiments, a limiting bulge is provided between the two electrodes on the inside wall of the placing groove; a limiting recess is provided between the two charging terminals of the charging section; a cross-sectional area of the limiting bulge gradually decreases from an end of the limiting bulge close to the bottom of the placing groove to an end of the limiting bulge away from the bottom of the placing groove; an opening is provided on an end of the limiting recess towards the bottom of the placing groove, a size of the limiting recess gradually increases from an end of the limiting recess away from the opening to an end of the limiting recess where the opening is provided.

By adopting the above technical solution, when clamping the first probe into the clamping spaces, aligning the limiting recess on the charging section to the limiting bulge, to embed the limiting bulge into the limiting recess; with the process mentioned above, when the first probe is being stored, the charging terminals may be ensured to be accurately abutted against the electrodes.

In some embodiments, two concession grooves are provided on two inside walls of the placing groove on both sides of the charging section.

By adopting the above technical solution, when it is necessary to remove the electrodes from the placing groove, with the concession grooves configured, the first probe is able to be easily taken out from the placing groove.

In some embodiments, a rotation groove is provided at an end of the body box close to the charging section; a rotation axis is provided between opposite inside walls of the rotation groove; a rotation disk is rotatably sleeved on the rotation axis; and the connecting section is connected to an outer wall of the rotation disk.

By adopting the above technical solution, when the second probe is needed to be used, with the rotation groove and the rotation axis configured, the rotation disk is able to be rotated around the rotation axis in the rotation groove, so that the second probe is able to be turned out of a side of the body box and used for temperature measurement; when the second probe needs to be stored, the rotation disk may be rotated so that the second probe is able to be stored in the body box.

In some embodiments, the rotation disk is provided with a limiting block; a stop block is provided on an inside wall of the rotation groove close to the limiting block; and when the rotation disk rotates, the limiting block abuts against the stop block.

By adopting the above technical solution, during the rotation of the rotating disk, with the limiting block and the stop block configured, when the second probe turns to the direction as the length direction of the body box, the limiting block touches the stop block; if the second probe is in use at this time, the body box may be held to facilitate the use and operation of the second probe.

In some embodiments, a holding groove is provided on a side of the body box, which is configured for the second probe to be embedded; a positioning groove is provided on a side of the body box where the holding groove is provided, which is configured for the second temperature measurement section to be embedded.

By adopting the above technical solution, when the second probe is used, the configuration of the holding groove provides a storage space for the second probe; in addition, when the second probe is stored, with the positioning groove configured, the second temperature measurement section is in the positioning groove, which may play a role of positioning the second temperature measurement section.

In summary, the present application includes at least one of the following beneficial technical effects:

1. when the temperature of the food is needed to be measured during cooking, if the food only needs to be processed in an enclosed environment, taking the first probe out of the body box, installing the first probe in the enclosed environment and inserting the first temperature measurement section into the food, the temperature of the food during cooking may be obtained; in addition, if the food is cooked and processed in a non-enclosed environment, directly inserting the first temperature measurement section on the first probe or the second temperature measurement section on the second probe into the food, the temperature of the food during cooking may be obtained; if the food needs to be cooked in an enclosed environment and taken out for processing, measuring the temperature with the first probe in the enclosed environment, and when the food is taken out from the enclosed environment, measuring the temperature with the second probe; in summary, the temperature of the food may be measured in an enclosed environment and it is convenient to measure the temperature of the food when the food is taken out of the enclosed environment for processing, which may improve the temperature measurement efficiency during the whole process of food cooking.

2. when storing and fixing the first probe, the configuration of the bending section facilitates the first probe to be embedded; and embedding the first probe between the two arc-shaped sections to place the first probe into the clamping spaces, so that the first probe may be stored and fixed.

3. when the second probe needs to be used, with the rotation groove and the rotation axis configured, the rotation disk is able to rotate around the rotation axis in the rotation groove, so that the second probe is turned out of a side of the body box and used for temperature measurement; when the second probe needs to be stored, the rotation disk may be rotated so that the second probe is stored in the body box.

DESCRIPTION OF THE EMBODIMENTS

The present application will be further described in detail below.

Figure 1:
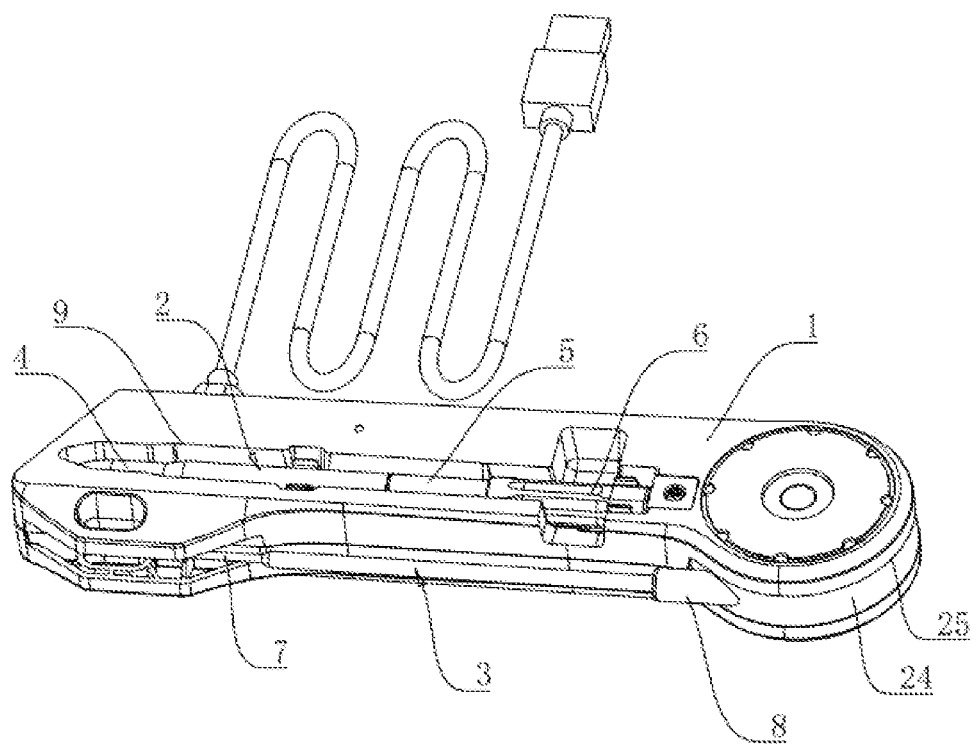
FIG. 1 is a structural schematic diagram of a body box, a first probe and a second probe according to an embodiment of the present application.

The present application provided a combined bluetooth thermometer according to an embodiment. Referring to FIG. 1, the combined bluetooth thermometer includes a body box 1, a first probe 2 and a second probe 3. The first probe 2 on the body box 1 is a wireless bluetooth thermometer and the second probe 3 on the body box 1 is a wired bluetooth thermometer. In the process of temperature measurement, the first probe 2 and the second probe 3 can transmit the measured temperature data.

Referring to FIG. 1, the first probe 2 is detachably installed on the body box 1. The first probe 2 may be detached from the body box 1 for measuring the temperature of the food during cooking in an enclosed environment or a non-enclosed environment. In the present embodiment, the enclosed environment mentioned above refers to a microwave, a steam oven or other enclosed cooking apparatus, and the non-enclosed environment refers to cooking equipment like a pot or a pan configured for directly frying or sautéing food. The first probe 2, along the length direction of the first probe 2, successively includes a first temperature measurement section 4, a transition section 5 and a charging section 6. The first temperature measurement section 4 is configured for temperature measurement. During the use of the first probe 2, the first temperature measurement section 4 is inserted into the food being cooked. The charging section 6 is configured for the electrical connection between the first probe 2 and the body box 1. When the first probe 2 is installed on the body box 1, the charging section 6 may be configured for charging the first probe 2.

Referring to FIG. 1, the second probe 3 includes a second temperature measurement section 7 and a connecting section 8. The second temperature measurement section 7 is configured for temperature measurement. When the food is cooked in a non-enclosed environment, the second temperature measurement section 7 of the second probe 3 may be configured for measuring the temperature of the food. The connecting section 8 is connected with the body box 1 to rotatably connect the second probe 3 with the body box 1. When it is to use the second probe 3 for measuring the temperature of the food, the second probe 3 may be rotated to separate the second temperature measurement section 7 from the body box 1.

Figure 2:
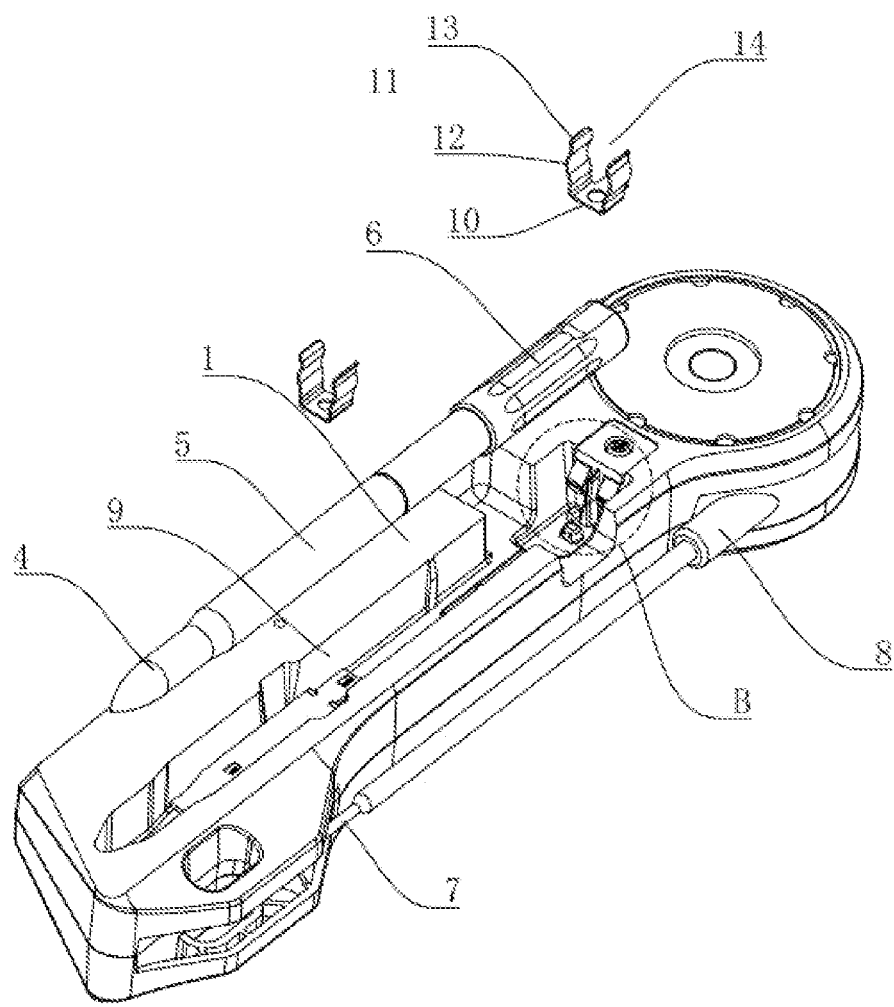
FIG. 2 is an explosion diagram for a limiting component and a first probe according to an embodiment of the present application.

Referring to FIG. 2, in order to achieve the detachable connection between the first probe 2 and the body box 1, the body box 1 is provided with a placing groove 9, and the length of the placing groove 9 is greater than the length of the first probe 2. A plurality of limiting components are provided in the placing groove 9 and a clamping space is formed between each of the plurality of limiting components for clamping the first probe 2, in order to achieve the fixing of the first probe 2 in the placing groove 9.

Referring to FIG. 2, in the present embodiment, each of the plurality of limiting components includes a connecting piece 10 and a limiting piece 11. The connecting piece 10 abuts against the bottom of the placing groove 9 and the connecting piece 10 is bolted to the bottom of the placing groove 9. Each of the plurality of limiting components includes two limiting pieces 11 that are respectively integrally formed at two ends of the connecting piece 10, and a clamping space is formed by the two limiting pieces 11 and the connecting piece 10. In addition, each limiting piece 11 includes an arc-shaped section 12 close to the connecting piece 10 and a bending section 13 integrally formed on an end of the arc-shaped section 12 away from the connecting piece 10. The bending sections 13 on the two limiting pieces 11 form a guiding opening 14 for the first probe 2 to be embedded. In the present embodiment, the limiting pieces 11 are elastic pieces, which may be metal pieces or elastic plastic pieces.

When accommodating and fixing the first probe 2, the first probe 2 is embedded into the body box 1 through the guiding opening 14. As the first probe 2 continues to be embedded, the joints between the arc-shaped sections 12 and the bending sections 13 are spread and the first probe 2 can be embedded between the two arc-shaped sections so that the first probe 2 is placed in the clamping space. When the first probe 2 is clamped between the two arc-shaped sections 12, and the joints between the arc-shaped sections 12 and the bending sections 13 abut against the first probe 2 so that the first probe 2 is accommodated and fixed.

Figure 3:
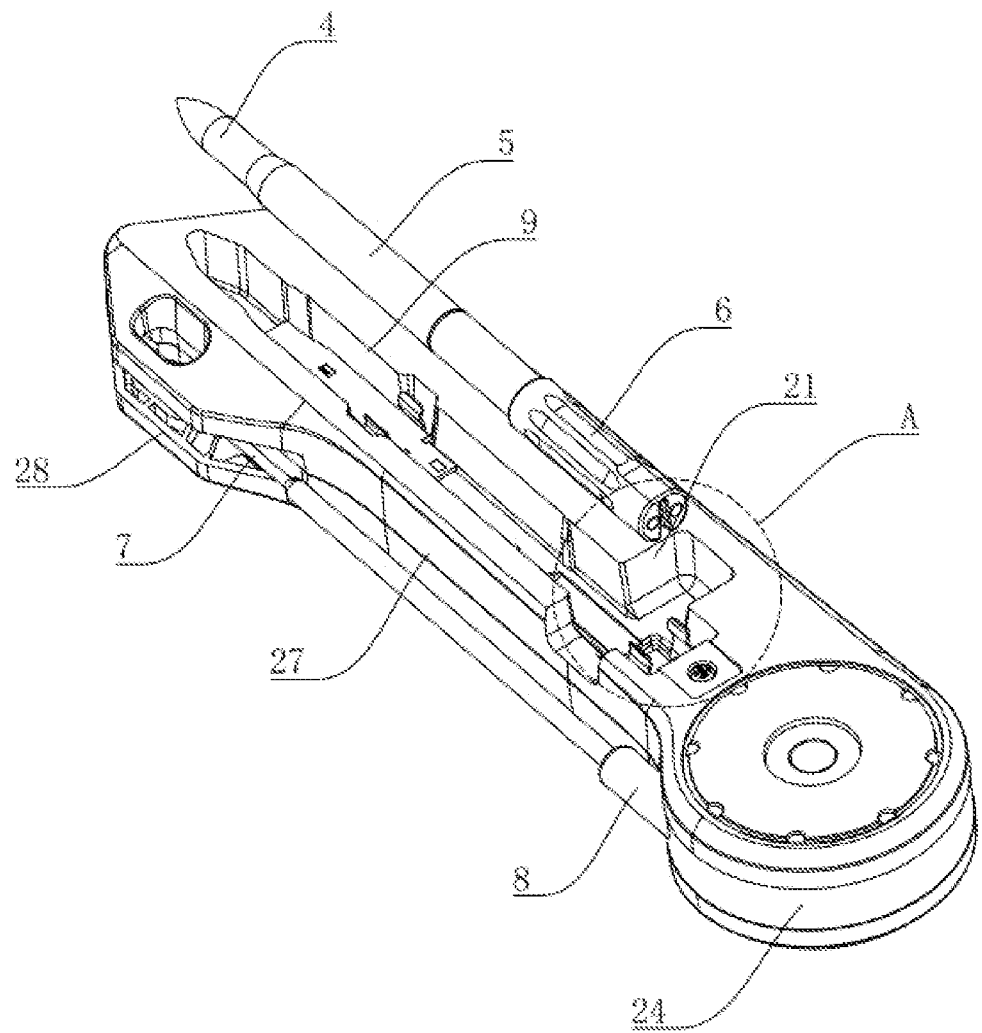
FIG. 3 is an explosion diagram for a body box and a first probe according to an embodiment of the present application.
Figure 4:
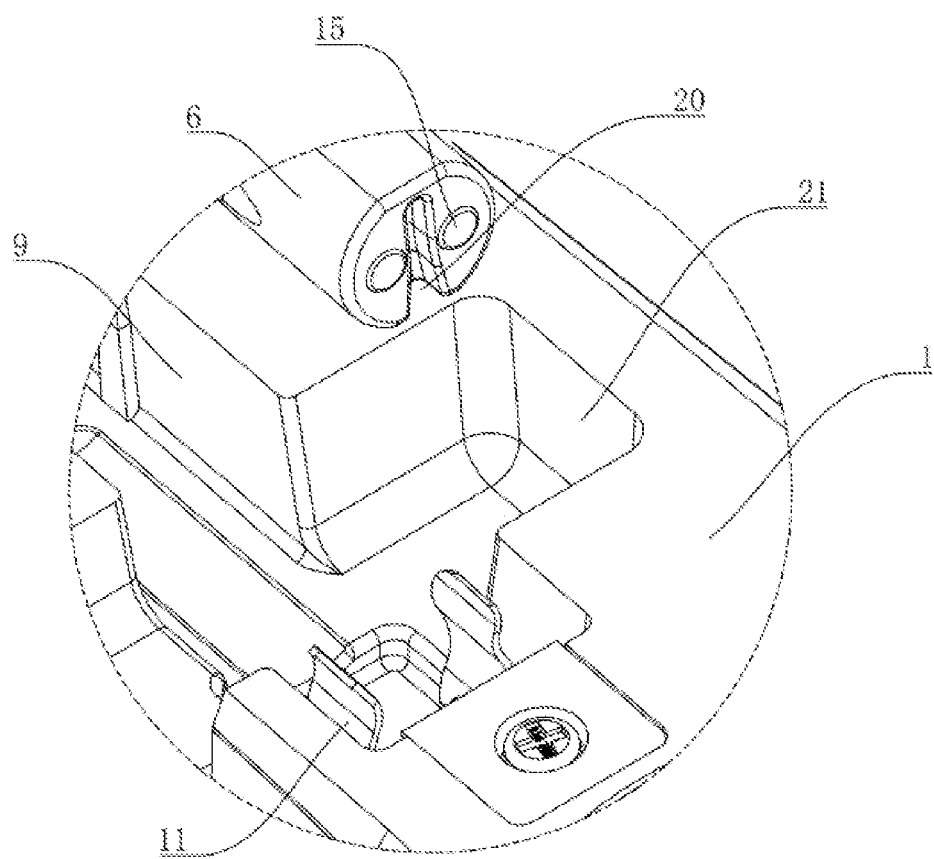
FIG. 4 is an enlarged schematic diagram of a part A in FIG. 3 according to an embodiment of the present application.

Referring to FIGS. 3 and 4, two charging terminals 15 are provided on a side of the charging section 6 away from the transition section 5, and two electrodes 16 are provided on an inside wall of the placing groove 9. When the first probe 2 is embedded in the clamping spaces, the charging terminals 15 abut against the electrodes 16 to charge the first probe 2. In addition, the electrodes 16 are elastic pieces or metal pieces. Each of the two electrodes 16 includes a sloping section 17 provided on the inside wall of the placing groove 9 and a straight-down section 18 connected with the sloping section 17. In embedding of the first probe 2 into the clamping spaces, the charging terminals 15 abut against the sloping section 17, and the charging terminals 15 slide on the sloping section 17 and press the sloping section 17. As the first probe is embedded into the clamping spaces, the charging terminals 15 slide from the sloping section 17 to the straight-down section 18, and the charging section 6 presses the straight-down section 18 such that the whole electrodes 16 deform, which may ensure the charging of the first probe 2.

Figure 5:
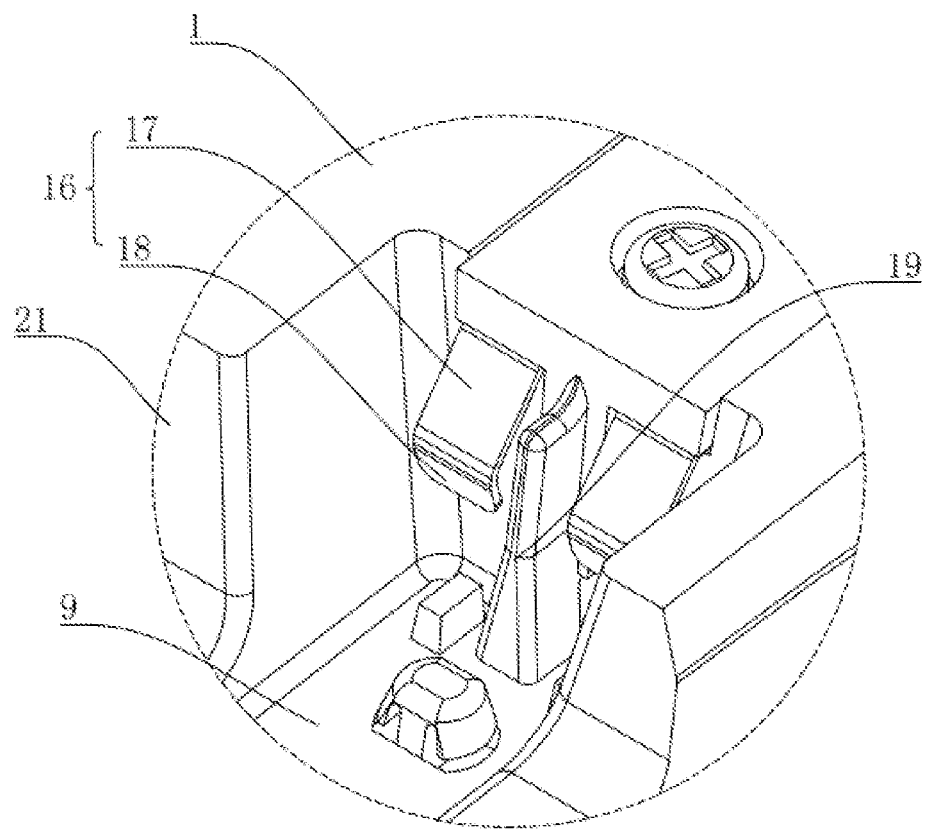
FIG. 5 is an enlarged schematic diagram of a part B in FIG. 2 according to an embodiment of the present application.

Referring to FIGS. 4 and 5, when accommodating and fixing the first probe 2, in order to ensure that the charging terminals 15 abut against the electrodes, a limiting bulge 19 is integrally formed between the two electrodes 16 on the inside wall of the placing groove 9, and a limiting recess 20 is provided between the two charging terminals 15 on the charging section 6. With providing of the limiting bulge 19 and the limiting recess 20, the first probe 2 may be accommodated by aligning the limiting recess 20 of the first probe 2 to the limiting bulge 19; at the same time, a cross-sectional area of the limiting bulge 19 gradually decreases from an end of the limiting bulge 19 close to the bottom of the placing groove 9 to an end of the limiting bulge 19 away from the bottom of the placing groove 9; an opening is provided on an end of the limiting recess 20 towards the bottom of the placing groove 9, a size of the limiting recess gradually increases from an end of the limiting recess 20 away from the opening to an end of the limiting recess 20 where the opening is provided, to facilitate the limiting bulge 19 to be embedded into the limiting recess 20.

Referring to FIG. 4, when the first probe 2 needs to be used, for the convenience of taking out the first probe 2 from the placing groove 9, concession grooves 21 are provided on the two inside walls of both sides of the charging section 6, which provides concession spaces for clamping the both sides of the charging section 6 on the first probe 2 and makes it convenient to take the first probe 2 out.

To accommodate and fix the second probe 3 on the body box 1, a rotation groove 22 is provided on an end of the body box 1 close to the charging section 6, and a rotation axis 23 is provided between the opposite inside walls of the rotation groove 22; a rotation disk 24 is sleeved and rotated on the rotation axis 23 and the connecting section 8 is connected to the outer side of the rotation disk 24. In this way, the second probe 3 may rotate on the body box 1.

Figure 6:
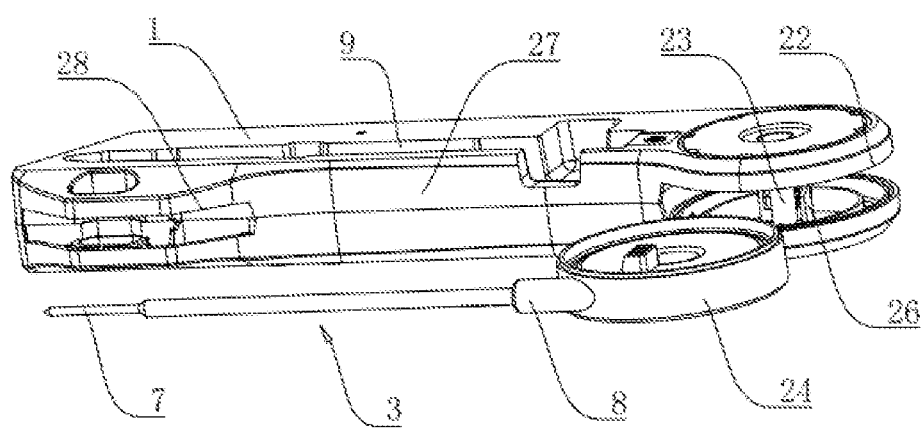
FIG. 6 is an explosion diagram for a rotating disk and a body box according to an embodiment of the present application, which illustrates a rotation axis and a stop block.
Figure 7:
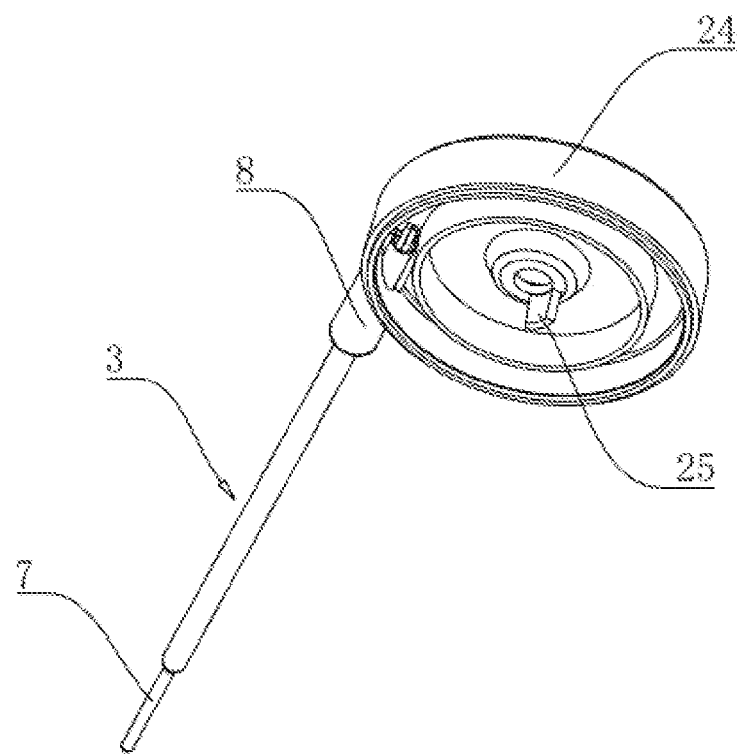
FIG. 7 is a structural diagram of a rotation disk and a second probe according to an embodiment of the present application, which illustrates a limiting block.

Referring to FIGS. 6 and 7, when the second probe 3 needs to be used, the second probe 3 may be taken out by rotation; and when the second probe 3 needs to be used, the second probe 3 is rotated to a direction same as the length direction of the body box 1, to facilitate the second probe 3 to be held. A limiting block 25 is integrally formed on the rotation disk 24 and a stop block 26 is integrally formed on an inside wall of the rotation groove 22 close to the limiting block 25. When the second probe 3 rotates to a direction same as the length direction of the body box 1, the limiting block 25 abuts against the stop block 26 to limit the further rotation of the rotation disk 24, so that the second probe 3 is rotated to a direction same as the length direction of the body box 1.

In addition, a holding groove 27 is provided on a side of the body box 1, which is configured for the second probe 3 to be embedded; when the second probe 3 is stored, the second probe 3 is located in the holding groove 27 and a positioning groove 28 is provided on the same side of the body box 1 where the holding groove 27 is provided, which is configured for the second temperature measurement section 7 to be embedded, so as to protect the second temperature measurement section 7 on the second probe 3.

The implementing principle of the combined bluetooth thermometer of the present application is: when it is necessary to measure the temperature of the food during cooking and the food needs to be processed only in an enclosed environment, the first probe 2 may be removed from the body box 1 and installed in the enclosed environment, and the first temperature measurement section 4 is inserted into the food, so that the temperature of the food during cooking may be obtained; in addition, if the food is cooked and processed in a non-enclosed environment, the first temperature measurement section 4 on the first probe 2 or the second temperature measurement section 7 on the second probe 3 may be directly inserted into the food, so that the temperature of the food during cook may be obtained; if it is necessary to cook the food in an enclosed environment and take out the food for processing, the first probe 2 may be used in the enclosed environment for processing, and the second probe 3 may be used for measuring the temperature when the food is taken out from the enclosed environment for processing; in summary, it is possible to measure the temperature of the food in an enclosed environment, and at the same time, it is convenient to measure the temperature of the food when the food is taken out of the enclosed environment, which is able to improve the efficiency of the temperature measurement in the overall process of food cooking; and during idle of the bluetooth thermometer, the first probe 2 may be stored in the placing groove 9 and the second probe 3 may be stored in the holding groove 27.

The above description is only preferable embodiments of the present application and is not intended to limit the protection scope of the present application. Any equivalent variations used according to the structures, shapes and principles in the present application should be included within the protection scope of the present application.

List of Reference Signs: 1. body box; 2. first probe; 3. third probe; 4. first temperature measurement section; 5. transition section; 6. charging section; 7. second temperature measurement section; 8. connecting section; 9. placing groove; 10. connecting piece; 11. limiting piece; 12. arch-shaped section; 13. bending section; 14. guiding mouth; 15. charging terminal; 16. electrode; 17. sloping section; 18. straight-down section; 19. limiting bulge; 20. limiting recess; 21. concession groove; 22. rotation groove; 23. rotation axis; 24. rotation disk; 25. limiting block; 26. stop block; 27. holding groove; 28. positioning groove.

What is claimed is:

1. A combined wireless thermometer, comprising: a body box, a first probe and a second probe; wherein,
   the first probe is detachably provided on the body box; the first probe, along a length direction of the first probe, successively comprises a first temperature measurement section, a transition section and a charging section; the first temperature measurement section is configured for temperature measurement; and the charging section is configured for providing an electrical connection between the first probe and the body box for charging the first probe;
   the second probe comprises a second temperature measurement section and a connecting section; the second temperature measurement section is configured for temperature measurement; and the connecting section is connected with the body box to rotationally connect the second probe with the body box,
   wherein the first probe and the second probe are separated from each other; the body box is provided with a placing groove; a plurality of limiting components are provided in the placing groove; a clamping space is formed in each of the plurality of limiting components for clamping the first probe; each of the plurality of limiting components comprises a connecting piece abutting against a bottom of the placing groove and two limiting pieces that are respectively provided at two ends of the connecting piece; the clamping space is formed between the two limiting pieces and the connecting piece; each of the two limiting pieces comprises an arc-shaped section close to the connecting piece and a bending section provided at a side of the arc-shaped section away from the connecting piece; a guiding opening is formed between the bending sections of the two limiting pieces; and the first probe is embedded in the guiding opening.

2. The combined wireless thermometer according to claim 1, wherein two charging terminals are provided on an end face of the charging section away from the transition section; two electrodes are provided on an inside wall of the placing groove; and when the first probe is embedded into the clamping spaces, the two charging terminals respectively abut against the two electrodes.

3. The combined wireless according to claim 2, wherein the two electrodes and the two limiting pieces are elastic pieces; each of the two electrodes comprises a sloping section provided on the inside wall of the placing groove and a straight-down section connected with the sloping section; and when the first probe is embedded in the clamping spaces, the two charging terminals respectively abut against the straight-down sections.

4. The combined wireless thermometer according to claim 3, wherein a limiting bulge is provided between the two electrodes on the inside wall of the placing groove; a limiting recess is provided between the two charging terminals of the charging section; a cross-sectional area of the limiting bulge gradually decreases from an end of the limiting bulge close to the bottom of the placing groove to an end of the limiting bulge away from the bottom of the placing groove; an opening is provided on an end of the limiting recess towards the bottom of the placing groove; and a size of the limiting recess gradually increases from an end of the limiting recess away from the opening to the end of the limiting recess where the opening is provided.

5. The combined wireless thermometer according to claim 1, wherein two concession grooves are provided on two inside walls of the placing groove on both sides of the charging section.

6. The combined wireless thermometer according to claim 1, wherein a rotation groove is provided at an end of the body box close to the charging section; a rotation axis is provided between opposite inside walls of the rotation groove; a rotation disk is rotatably sleeved on the rotation axis; and the connecting section is connected to an outer wall of the rotation disk.

7. The combined wireless thermometer according to claim 6, wherein the rotation disk is provided with a limiting block; a stop block is provided on an inside wall of the rotation groove close to the limiting block; and when the rotation disk rotates, the limiting block abuts against the stop block.

8. The combined wireless thermometer according to claim 1, wherein a holding groove is provided on a side of the body box, which is configured for the second probe to be embedded; and a positioning groove is provided on a side of the body box where the holding groove is provided, which is configured for the second temperature measurement section to be embedded.

* * * * *